No. 648,735. Patented May 1, 1900.
J. FREDENBURGH.
THILL COUPLING.
(Application filed Jan. 31, 1900.)

(No Model.)

WITNESSES:
Geo. W. Naylor
Fred Acker

INVENTOR
John Fredenburgh
BY
Munn
ATTORNEYS

United States Patent Office.

JOHN FREDENBURGH, OF ATHENS, PENNSYLVANIA.

THILL-COUPLING.

SPECIFICATION forming part of Letters Patent No. 648,735, dated May 1, 1900.

Application filed January 31, 1900. Serial No. 3,440. (No model.)

*To all whom it may concern:*

Be it known that I, JOHN FREDENBURGH, a citizen of the United States, residing at Athens, in the county of Bradford and State of Pennsylvania, have invented a new and Improved Thill-Coupling, of which the following is a full, clear, and exact description.

The invention relates to that class of inventions whose purpose is to detachably connect the thills or shafts to the axle-clips of a vehicle.

The object of the invention is to so construct the device that the thills or shafts may be raised or lowered to extreme positions and so that while the vehicle is in use there will be no lost motion or rattling in the connection between the thills or shafts and the vehicle.

The invention consists in the novel construction and combinations of the several parts, as will be hereinafter fully set forth, and pointed out in the claims.

Reference is to be had to the accompanying drawings, forming a part of this specification, in which similar characters of reference indicate corresponding parts in all the figures.

Figure 1:
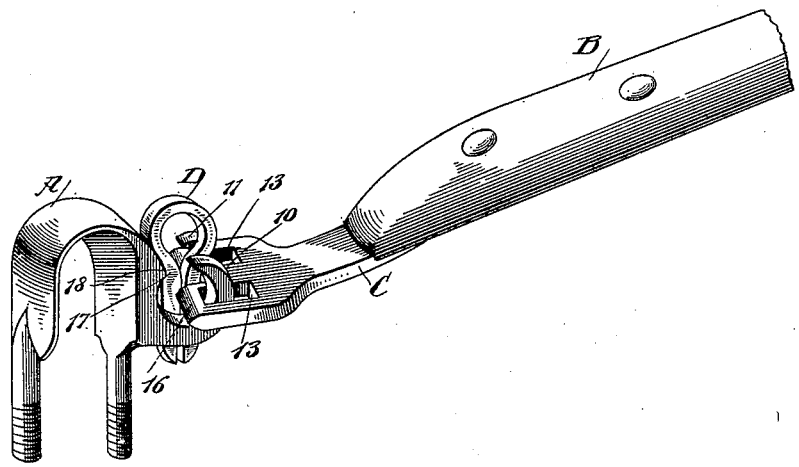
Figure 2:
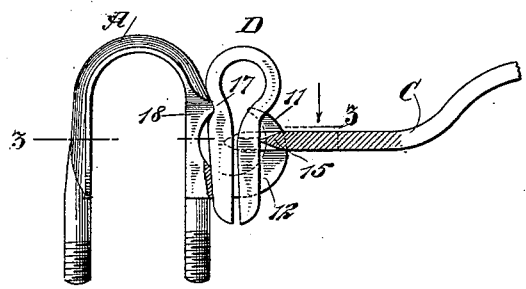
Figure 3:
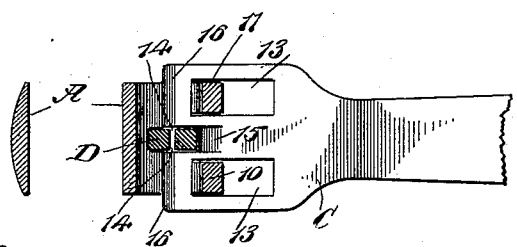

Figure 1 is a perspective view of the improved device. Fig. 2 is a vertical section taken centrally through the hooks of the clip and through one of the thill-irons of the shafts or thills, and Fig. 3 is a horizontal section taken substantially on the line 3 3 of Fig. 2.

The clips A employed, which are usually attached to the front axle, may be of any approved construction and may be fastened in any desired manner, and each of said clips A is provided at the upper portion of its forward face with two hooks 10 and 11, a space 12 occurring between the said hooks, as shown in Fig. 2, and as is likewise indicated in Fig. 1.

The shafts or thills B are provided with the usual irons C, and each of the said irons is provided with two longitudinal openings 13, which openings are adapted to receive the hooks 10 and 11, carried by the clips A. A slot 14 is produced in each thill-iron between the openings 13, and the slots 14 extend through the rear ends of the thill-irons. The rear walls of the slots 14 are beveled in opposite directions at the top and at the bottom, as indicated at 15 in Fig. 3, whereby the said rear walls of the slots 14 are given practically a wedge shape. This inclination of the rear walls of the slots 14 permits the thill-irons to be readily raised and lowered when they are fastened in position relative to the clips A through the medium of cotter-pins D, the application of which will be hereinafter referred to. The rear edges of the thill-irons C are also beveled in opposite directions or given a wedge shape, as shown at 16 in Figs. 1 and 2, so that the thill-irons may be raised and lowered to a greater extent than if these parts were straight. The cotter-pin D, above referred to, is of the usual type, with the exception that said cotter-pin where its head connects with the shank is provided with a recess 17, which receives a projection or a boss 18, formed upon the clip in connection with which the cotter-pin is used, as shown in Fig. 1.

In the application of the device a thill-iron C is connected with a clip A by causing the hooks 10 and 11 of the clip to pass up through the openings 13 in the thill-iron, as is clearly indicated in Fig. 1. Next the shank of a cotter-pin D is forced down through the slot 14 in the thill-iron and through the space which occurs between the hooks 10 and 11 of the clip until the recess 17 in the cotter-pin just referred to receives the projection 18 from the clip. Under this arrangement the cotter-pin is prevented from leaving its position, and the shafts or thills are free to be raised upward or downward, and it is impossible for the shafts or thills to become detached from the clips A under any conditions of use. It may also be observed that when the thills or shafts are in working position the edges of the thill-irons C, produced by beveling the inner walls of the slots 14 in said thill-irons, have such binding engagement with the clips A at a point below and in advance of the connection of the cotter-pins with the clips that the cotter-pins are effectually prevented from leaving their places.

Having thus described my invention, I claim as new and desire to secure by Letters Patent—

1. In a thill-coupling, a clip provided with hooks at its forward surface, a thill or shaft iron having openings therein adapted to receive the said hooks, and a slot between the openings, and a spring-pin adapted to be passed downward between the hooks through the slot between the openings in the thill-iron, and through the space between the hooks of the clip, the said spring-pin and clip having a locking engagement whereby the pin is prevented from moving upward, as specified.

2. In a thill-coupling, a clip provided with upwardly-extending hooks at its forward surface, the said clip having a forward projection facing the hooks, a thill or shaft iron having openings therein adapted to receive the hooks of the clip, and a cotter-pin provided with a recess in its shank, adapted to receive the projection from the clip, said cotter-pin being arranged to pass through the slot between the openings in the iron of the thills or shafts and through the space between the hooks of the clip, as described.

3. In a thill-coupling, the combination, with a clip provided with spaced hooks at its forward face, having an upward turn, and a projection from its under surface facing the upper portions of the said hooks, of a thill or shaft iron provided with longitudinal openings adapted to receive the said hooks and a slot between the said openings, extending through the rear end of the said iron, the forward wall of the said slot being oppositely beveled at the top and at the bottom, the side rear portions of the thill-iron being correspondingly beveled, and a cotter-pin having a recess therein adapted to receive the projection from the said clip, the cotter-pin being adapted to pass through the slot in the thill-iron and downward through the space between the hooks of the clip, as specified.

In testimony whereof I have signed my name to this specification in the presence of two subscribing witnesses.

JOHN FREDENBURGH.

Witnesses:
EDWARD S. JOHNSON, Jr.,
A. M. FREDENBURG.